United States Patent

[11] 3,600,830

| [72] | Inventor | Bjorn Staffan Artur Hamrin<br>Bjarred, Sweden |
|---|---|---|
| [21] | Appl. No | 847,001 |
| [22] | Filed | July 29, 1969 |
| [45] | Patented | Aug. 24, 1971 |
| [73] | Assignee | Svenska Sockerfabriks Aktiebolaget<br>Malmo, Sweden |
| [32] | Priority | Aug. 16, 1968 |
| [33] | | Sweden |
| [31] | | 11039/68 |

[54] HOLLOW PELLETS FOR SEED
4 Claims, No Drawings

[52] U.S. Cl. ............... 47/57.6, 117/3, 117/63
[51] Int. Cl. ............... A01n 21/02
[50] Field of Search. ............... 47/1, 37, 57.6, 58, DIG. 9; 117/5.5, 63, 3; 71/1, 64

[56] References Cited
UNITED STATES PATENTS

| 1,713,679 | 5/1929 | Snelling ............... | 117/63 X |
| 2,313,057 | 3/1943 | Fischer ............... | 71/1 |
| 2,502,809 | 4/1950 | Vogelsang ............... | 47/58 |
| 2,553,577 | 5/1951 | Hale et al. ............... | 47/57.6 |
| 2,651,883 | 9/1953 | Hedrick et al. ............... | 47/57.6 |

FOREIGN PATENTS

| 107,958 | 6/1927 | Austria ............... | 47/DIG. 9 |
| 1,099,386 | 1/1968 | Great Britain ............... | 47/DIG. 9 |
| 92,046 | 12/1921 | Switzerland ............... | 47/DIG. 9 |

*Primary Examiner*—Robert E. Bagwill
*Attorney*—Beveridge & De Grandi

ABSTRACT: The present invention is concerned with the problem of protecting seed during the initial germination stage. According to the invention it has been discovered that considerable advantages are obtained if the seed is covered with an outer porous shell or pellet within which the seed lies freely in a space allowing an initial development or germination and protecting the seed against surrounding pests and the like until such time when the pellet bursts and the germinated seed is vital enough to withstand attack from such pests.

HOLLOW PELLETS FOR SEED

This invention relates to hollow pellets for seed and to a method of making such pellets for protecting the seed in the initial germination stage.

It is already known to pelletize seed. However, the pellets produced have been massive and such pellets cannot be used for all types of seed and in some cases are directly unsuitable, for which reason pelletization could not be used. Moreover, certain seed types, because of inferior germinating power or external infections, attack by pests etc., give a low germination yield.

It has now been discovered that considerable advantages are obtained if the seed lies freely within an outer porous shell forming the pellet wall. Because of the porous character of the shell or pellet, water, air and germination stimulating solutions etc. can freely diffuse towards the seed which is protected by the pellet and no longer is exposed to attack by infections and pests. Moreover, the initial germination occurs within the pellet which does not burst until the plant has begun to develop, i.e. when the germinating seed has attained a certain resistance to its surroundings. In its initial germination stage, the seed thus is adequately protected by the pellet.

The pellet according to the present invention is characterized in that it comprises a shell consisting of a porous material pervious to water and growth stimulating substances, the seed lying freely in the shell which has such a strength that it ruptures when the seed germinates.

Further advantages are obtained by treating the pellet with insecticides and possibly by dyeing the pellet blue so that it is not readily seen by birds.

The production of the pellets according to the present invention is effected in conventional pelletizing machines. The seed is first pelletized in conventional manner, using a water-soluble material not detrimental to the seed. When the pellet has obtained the desired size, the pelletizing with the water-soluble material is interrupted, whereupon pelletizing is continued for application of one or more layers consisting of a porous water-insoluble material. The pellet is then steeped in water so that the water-soluble material diffuses out through the outer layer without damaging it. After steeping, the pellet is dehydrated and dried. It is also possible to add germination and growth stimulating substances to the water after the water-soluble material has been dissolved out.

The practice of this invention will be illustrated in the following where the pelletization of pine seed has been chosen by way of example. One kilogram of pine seed was moistened in water in a pelletizing drum. Finely ground sterile sugar was added in batches until the pellet had attained the desired size, i.e. the seed was completely covered with sugar. The pellet was rotated for approximately 15 minutes to obtain a harder surface layer. During this initial pelletizing, the sugar consumption amounted to 10 kg. and pelletizing was conducted for approximately 2 hours. Approximately ½ liter of water was used. After the pellet surface had hardened somewhat, the pellet was carefully moistened with water, whereupon finely ground cellulose was added to the pelletizing drum to build up a layer of cellulose on the sugar core. When a layer having a thickness of about 1 mm. had been obtained, pelletizing was discontinued. When cellulose is used, it is possible to add some adhesive to facilitate binding of the cellulose. The cellulose consumption was approximately 2 kg. From 1 to 2 liters of the adhesive solution, 2 percent sodium alginate in water, were consumed. The duration of this second pelletizing was approximately 45 minutes. The pellets were sorted and soaked in water so that the sugar was dissolved and diffused out through the cellulose wall. After all sugar had been dissolved out, germination and growth stimulating substances in the form of kinetin were added to the water. The pellets were drained and then dried at approximately 40° C. The finished pellets are stored at about +4° C.

Naturally, also other substances not detrimental to the seed may be used instead of sugar, and for the outer porous layer substances other than cellulose may be employed. As already mentioned, the pellet can be treated with insecticides and possibly dyed, preferably blue. Moreover, it is possible to add the germination and growth stimulating substances to the pellet shortly before the sowing, instead of during the production of the pellet. The seed pelletized in this manner can be stored equally long as the naked seed without deterioration of its quality.

In a simpler and a quicker method for producing the hollow pellets the seeds are introduced into the pelletizing machine and coated with a gel-degrading material such as boric acid which is sprayed over the seeds in the machine, whereupon a gelling material such as sodium alginate is applied in the form of a finely ground powder, while simultaneously spraying a minor amount of water. When the pellets have attained the desired size, they are coated with cellulose, as in the earlier method, possibly by adding an adhesive which may also consist of sodium alginate. Shortly after the application of the cellulose, the gel is degraded by the boric acid so that it swells and is absorbed by the porous shell, leaving an empty space around the seed. The shell is highly reinforced by the alginate it has absorbed so that it can withstand considerable mechanical stresses without bursting, while simultaneously retaining its porosity and ability to absorb germination and growth stimulating substances as well as protective substances and colorants.

In a further method of producing hollow pellets, the seeds are coated with water in cold atmosphere, whereupon the resulting haillike granules are coated with a porous material such as cellulose. When the pellet is thawed, the water escapes through the shell so that the seed lies freely within the pellet.

I claim:

1. A method of making a seed capsule comprising coating a seed with a gel-degrading material to form a first layer, coating said first layer with a gelling material to form a second layer, coating said second layer with a porous but substantially water insoluble gel-absorbing material to provide a third layer, whereupon said first layer reacts with said second layer to swell the same and cause it to be absorbed by said third layer, whereby said seed is encapsulated by and lies freely within said third layer.

2. A method according to claim 1 wherein said gel-degrading material is boric acid, said gelling material is sodium alginate, and said gel-absorbing material is comprised of ground cellulose.

3. A method according to claim 1 wherein a composition selected from the group consisting of nutrients, growth stimulants, fungicides, insecticides and herbicides, or mixtures thereof, is added to at least one of said layers.

4. A method of making a seed capsule comprising coating a seed with water, freezing the same to provide a first layer of ice about said seed, coating said first layer with a porous but substantially water insoluble material to form a capsule, and thawing said capsule, whereupon the resultant water passes through said third layer and the seed lies freely therein.